United States Patent [19]
Yoshida

[11] Patent Number: 4,765,586
[45] Date of Patent: Aug. 23, 1988

[54] VALVE-CLOSING ALIGNING MECHANISM FOR AN INCLINED VALVE

[75] Inventor: Osamu Yoshida, Takahashi, Japan

[73] Assignee: Eagle Industry Co. Ltd., Tokyo, Japan

[21] Appl. No.: 430,567

[22] Filed: Sep. 30, 1982

[30] Foreign Application Priority Data

Oct. 9, 1981 [JP] Japan .................... 56-161307

[51] Int. Cl.$^4$ .............................................. F16K 1/00
[52] U.S. Cl. ........................................ 251/86; 251/333
[58] Field of Search ................... 251/84, 86, 368, 333

[56] References Cited

U.S. PATENT DOCUMENTS

| | | | |
|---|---|---|---|
| 2,228,849 | 1/1941 | Sandos | 251/86 X |
| 3,472,481 | 10/1969 | Spies | 251/86 X |
| 4,197,873 | 4/1980 | Minogue | 137/219 X |
| 4,431,159 | 2/1984 | Stubbs | 251/368 X |

Primary Examiner—Alan Cohan
Attorney, Agent, or Firm—Jordan and Hamburg

[57] ABSTRACT

A mechanism wherein a poppet for opening and closing a valve seat which is disposed on the internal peripheral surface of a body has the outside diameter on the side opposite the valve seat made slightly smaller than the outside diameter on the side of the valve seat. An abutment portion of poppet is formed as a convergent tapered surface, and when the valve is closed, the poppet is slidably moved in an aligning direction with respect to the body.

7 Claims, 6 Drawing Sheets

VALVE-CLOSING ALIGNING MECHANISM FOR AN INCLINED VALVE

BACKGROUND OF THE INVENTION

The present invention relates to a valve-closing mechanism for an inclined valve.

At present, in a Y-shaped automatic ball valve as shown in FIG. 1, the valve is driven by a pneumatic cylinder (b) with a leading valve (a). The mounting attitudes include two types, one in which the valve shaft is perpendicular to a horizontal pipe as shown in FIG. 2B, hereinafter referred to as an "Upright valve", and the other in which the shaft is inclined 15° from the perpendicular (FIG. 2C, hereinafter referred to as an "Inclined valve". Both of these valves are designed so that when the valve is opened or closed, a poppet (c) is guided by ribs (e) formed on the internal surface of a body (d). Normally, three ribs (e) are provided at locations as shown in FIG. 3. Because of which the poppet (c) becomes eccentric at its axis with respect to the axis of the body (d) due to its own weight. This is one of causes of impairing the good operation of the Y-shaped automatic ball valve. Particularly, in the aforementioned inclined valve, the poppet (c) falls between the ribs (e), and the amount of such fall is added to the amount of eccentricity (½ of the difference between the inside diameter of the body (d) and the outside diameter of the poppet (c)) of the upright valve, thereby giving rise to a greater eccentricity. Especially, in the event that deterioration such as an increase in frictional resistance of the valve seat portion occurs during use, smooth aligning of the poppet is impossible to obtain, and therefore, an improvement thereof has long been desired.

SUMMARY OF THE INVENTION

In view of the above, the present invention provides an arrangement wherein when the valve is closed, the poppet in abutment with the valve seat of the body is self-aligned with respect to the axis of the body (valve seat) to positively close the valve. To achieve the aforesaid object, there is provided an inclined valve in which a poppet is movable, and a valve seat is formed between the passage portion on an inlet side and a passage portion on an outlet side of a body, wherein the outside diameter of the poppet on the axial upper side thereof is made slightly smaller than the axial lower side thereof. A convergent tapered guide portion is formed in the external periphery of a valve seat portion of the poppet so that when the valve is closed, the tapered guide portion of the poppet is slidably moved with respect to the cylindrical surface adjacent to the valve seat portion of the body in an aligning direction.

While the outline of the present invention has been described briefly, the present invention and other objects and novel features thereof will be more completely apparent by reading the ensuing detailed description in conjunction with the embodiments shown in the accompanying drawings. However, the drawings comprise a mere embodiment for the exclusive illustration of the present invention and are not intended to limit the scope of the invention.

DESCRIPTION OF PREFERRED EMBODIMENTS

Figure 1:
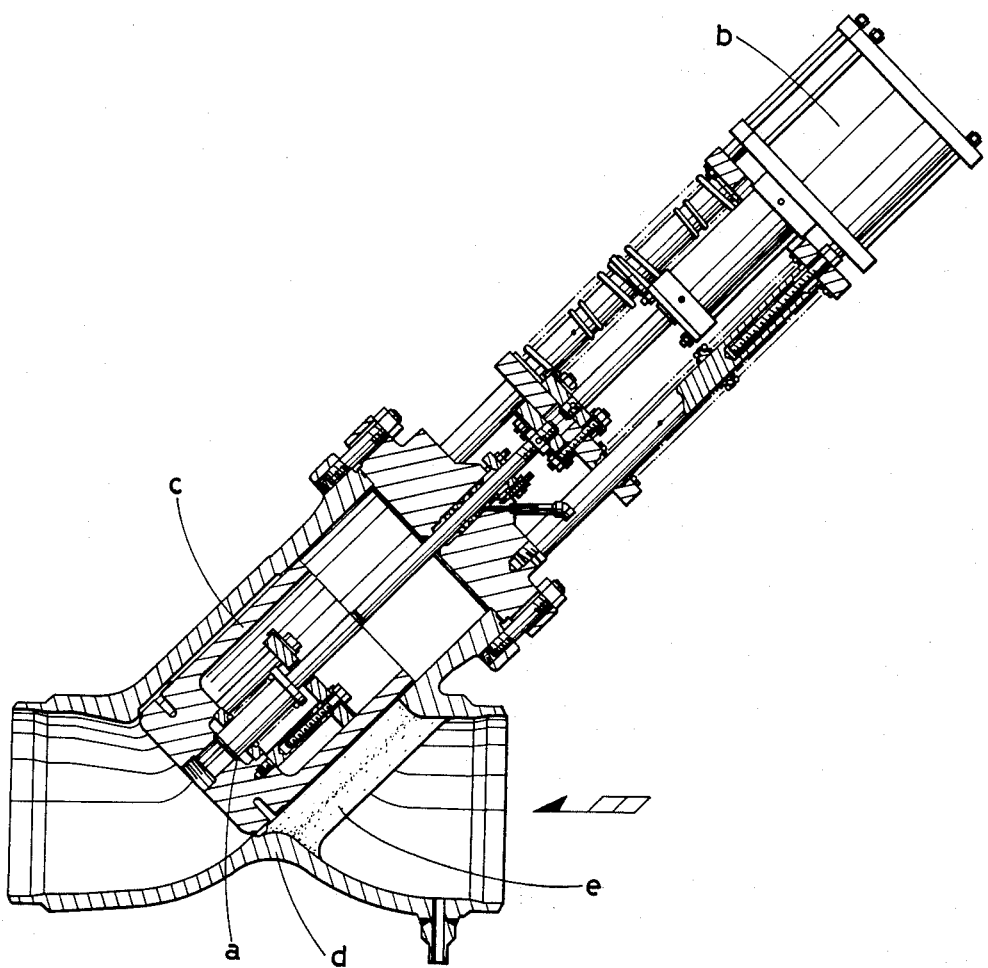
FIG. 1 is a side sectional view of a prior art Y-shaped automatic ball valve.
Figure 2A:
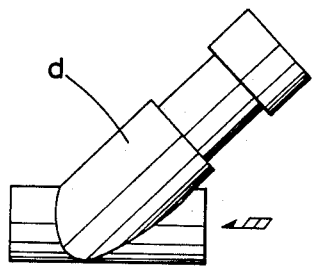
FIG. 2A is a side view schemicatically showing the valve in FIG. 1.
Figure 2B:
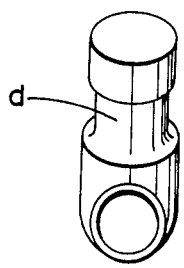
FIG. 2B is a front view of a prior art upright valve.
Figure 2C:
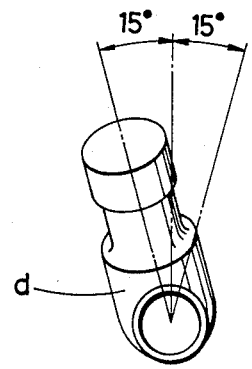
FIG. 2C is a front view of a prior art inclined valve.
Figure 3A:
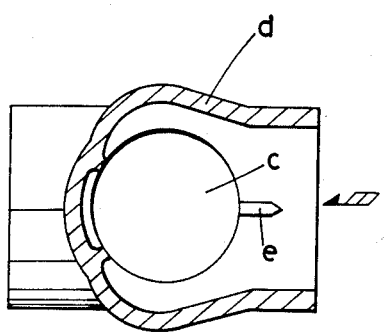
FIG. 3A is a front view of a body of an upright valve.
Figure 3B:
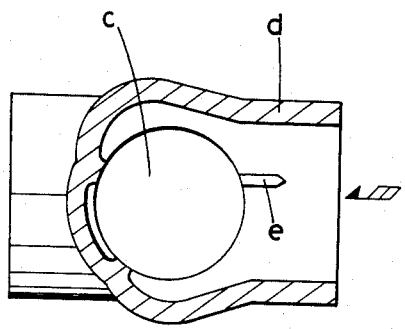
FIG. 3B is a sectional view of a body of a prior art inclined valve.
Figure 4:
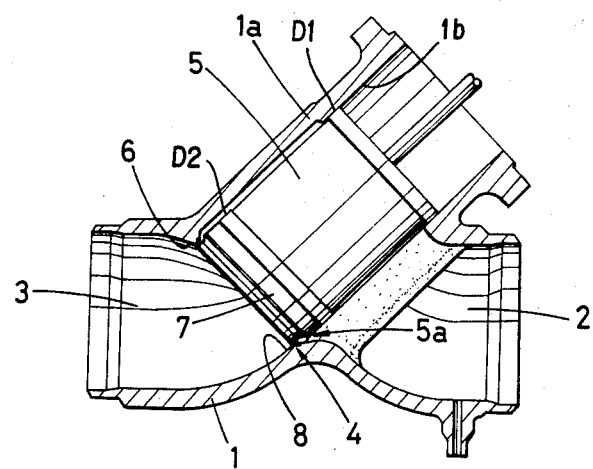
FIG. 4 is a side sectional view of an inclined valve provided with a valve-closing aligning mechanism according to one embodiment of the present invention.

A first embodiment of the present invention will be described with reference to FIGS. 4 to 7. As shown, a body (1) of an inclined valve is formed, on opposite sides of a valve seat (4), with an inlet side passage portion (2) and an outlet side passage portion (3), which have an inside diameter in accordance with the flow rate, and a cylindrical body (1a) having an internal cylindrical wall (1b) internally receiving a poppet (5) in both passage portions (2) (3). The poppet (5) is integrally formed and perpendicularly intersects the valve seat (4). The poppet (5) has an outside diameter on the axial upper side thereof, as indicated at D1 in FIG. 4, made slightly smaller than the outside diameter on the axial lower side thereof as indicated at D2. A convergent tapered guide portion (6) is formed on the external periphery of the valve seat portion (5a) of the poppet (5). Preferably, the difference in outside diameter between the upper and lower portions D1 and D2 is normally 0.5 mm to 1.5 mm.

Figure 6:
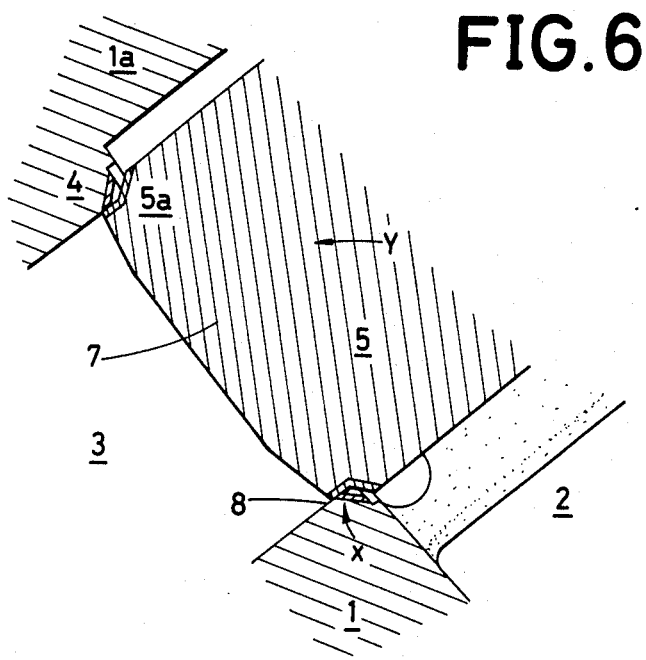
Figure 7:
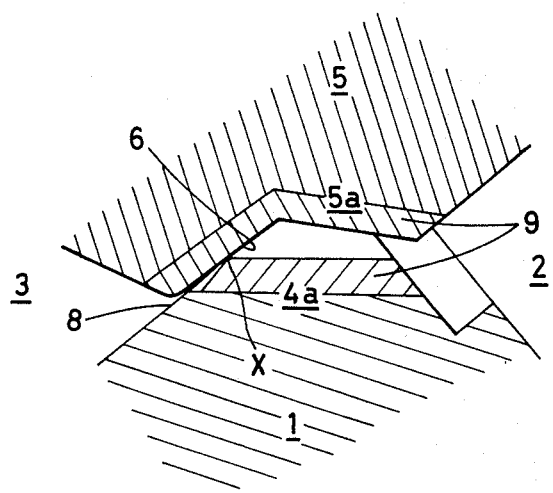

The tapered guide portion (6) is formed on the external periphery of a conical portion (7) formed at the extreme end of the poppet (5) at valve seat portion (5a) as shown in FIG. 6. The guide portion (6) is formed in a tapered shape which gradually decreases in diameter towards the extreme end of the poppet (5) and is formed to have a peripheral foremost end which is received in a cylindrical guide surface (8) adjacent the valve seat (4) of the body (1). Preferably, a hardened member 9 is suitably built up on the conical cylindrical portion 7 and the cylindrical guide surface (8) to prevent wear or damage resulting from the frictional contact therebetween. The hardened member 9 includes, for example, stellite.

Figure 5:
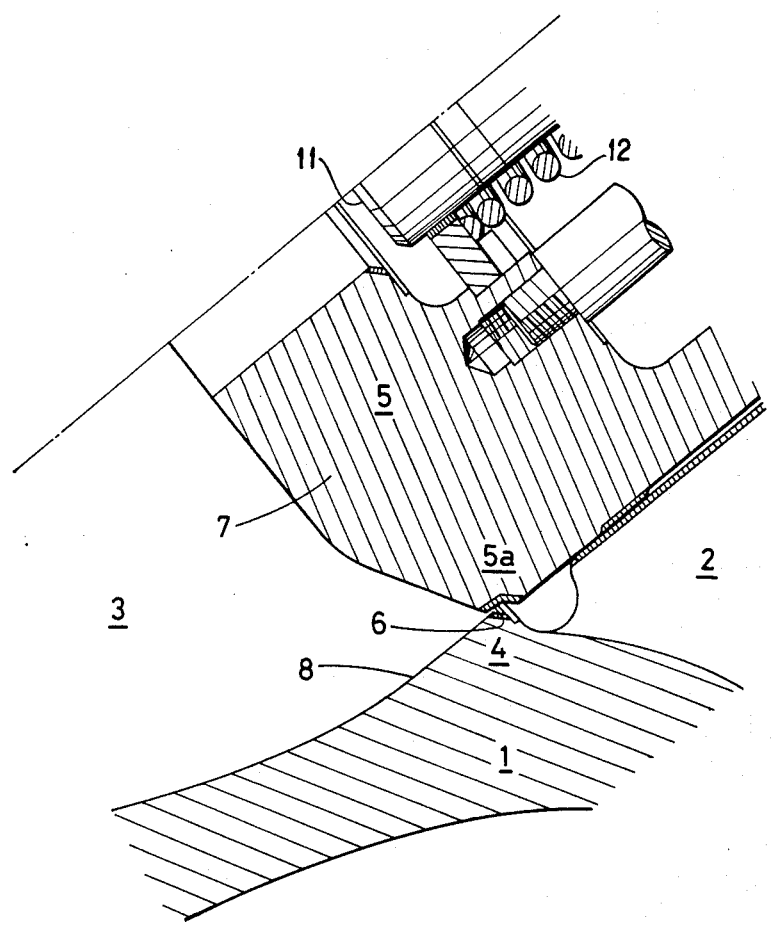
FIGS. 5 to 7 are respectively enlarged sectional views of an essential portion of an inclined valve provided with a valve-closing aligning mechanism.

In the valve-closing mechanism for an inclined valve as constructed above, when the valve is being closed and the poppet (5) moves down in a condition eccentric with respect to the axis of the body (1) as mentioned hereinbefore, the tapered guide portion (6) formed on the valve seat portion (5a) of the poppet (5) is slidably moved along the valve seat (4), and the cylindrical surface adjacent thereto and is received in the cylindrical guide (8). The poppet (5) then restores its concentricity as it moves down, the poppet moving down a suitable amount and being slidably moved in an aligning direction so that the body (1) and the valve seat of the poppet (5) come into contact each other. When there is no alignment, the poppet (5) is pivoted (in the direction of arrow Y) about the abutment point (x) between the poppet (5) and the body (1) due to the increase in pressure of the pneumatic cylinder (not shown) since the outside diameter D1 on the upper side of the poppet (5) is made slightly smaller than the outside diameter D2 on the lower side thereof and also smaller than the diameter of the interal wall (1b), whereby the poppet is seated on the valve seat (4). To provide for such pivoting the poppet 5 is non-rigidly mounted on the valve stem 11 such as by a spring 12 as shown in FIG. 5. Thus, the inclined valve provided with the valve-closing aligning mechanism for an inclined valve displays an aligning action not inferior to that of the upright valve.

Figure 8:
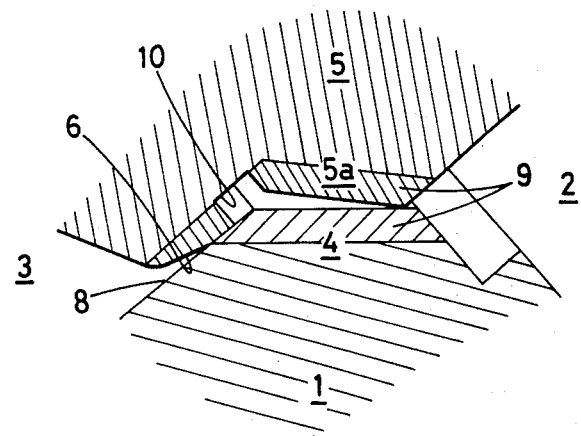
FIG. 8 is a side sectional view of an essential portion of an inclined valve provided with a valve-closing aligning mechanism showing a second embodiment.

FIG. 8 shows a second embodiment of the present invention which is different from the above-described first embodiment in that the poppet (5) in the second embodiment has an annular groove (10) formed between the valve seat portion (5a) and the tapered guide portion (6). This annular groove (10) is provided to enhance the operability when the surface of the valve seat portion (5a) is subjected to lapping by means of a suitable tool (not shown). That is, if the tool is escaped into the annular groove (10) during lapping, it is possible to perform a sufficient lapping operation over the entire surface of the valve seat portion (5a). Further, by the provision of the annular groove (10), when the poppet (5) is pivoted with respect to the body (1) as described hereinbefore, the abutment point between the tapered guide portion (6) located below the annular groove (10) and the cylindrical guide surface (8) of the body (1) serves as a fulcrum of the lever action upon such pivoting, thus assisting the aligning action.

Figure 9:
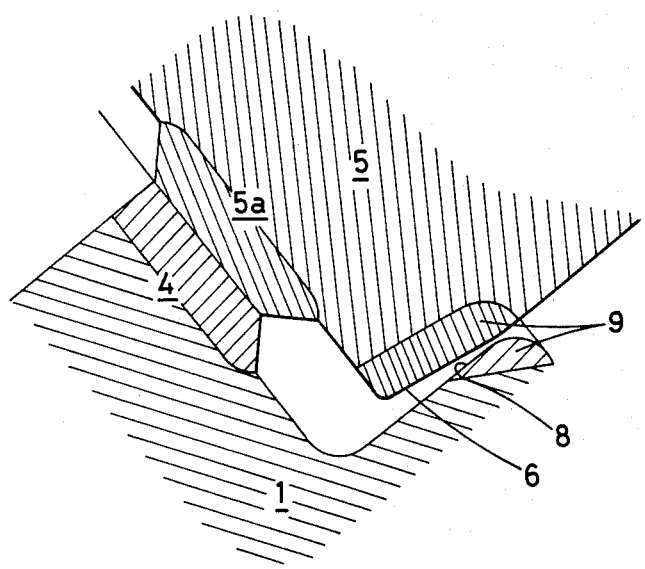
FIG. 9 is a side sectional view of an essential portion of an inclined valve provided with a valve-closing mechanism showing a third embodiment.

FIG. 9 shows a third embodiment which is of the type in which both the valve seat portion (5a) of the poppet (5) and the valve seat (4) of the poppet (1) are brought into contact at right angles, a so-called flat seat type, whereas in the first embodiment, they are brought into contact obliquely with respect to the axial direction. In this third embodiment, the tapered guide portion (6) is formed on the external peripheral portion at the extreme end of the poppet (5), and a hardened member 9 formed of a low friction and wear resisting material is built up on the tapered guide portion (6) and the cylindrical guide surface (8) of the body (1). The hardened member 9 includes, for example, stellite.

The present invention provides an inclined valve wherein a poppet is movable and a valve seat is formed between the passage portion on an inlet side and a passage portion on an outlet side of a body. The outside diameter of the poppet on the axial upper side thereof is made slightly smaller than the axial lower side thereof, and a convergent tapered guide portion is formed on the external periphery of a valve seat portion of the poppet so that when the valve is closed, the tapered guide portion of the poppet is slidably moved with respect to the cylindrical surface adjacent to the valve seat portion of the body, and wherein when there is non-alignment, an increase in pressure of a pneumatic cylinder causes the poppet to pivot about an abutment point as a fulcrum between the poppet and the body so that the poppet may be aligned and seated on the valve seat. In addition, the valve-closing aligning mechanism in accordance with the present invention may be used by modifying the shape of the poppet in existing inclined valves. The mechanism has excellent operability and can contribute to cost reduction.

What is claimed is:

1. A valve-closing aligning mechanism for an inclined valve comprising a valve body, an annular valve seat means in said body, said annular valve seat means having a seat conical section and a juxtaposed cylindrical section such that the smaller diameter of said seat conical section is coincident with the upper longitudinal end of said cylindrical section along a coincident circle, a generally cylindrical poppet means in said valve body, said valve body having a generally cylindrical internal wall means in which said cylindrical poppet means is axially movable, said cylindrical internal wall means having an axis which is inclined relative to vertical, said cylindrical poppet means also having an axis which is inclined relative to vertical, said poppet means having an upper axial cylindrical end portion and a lower axial cylindrical end portion, said upper axial cylindrical end portion having a smaller diameter than said lower axial cylindrical end portion, said upper axial cylindrical end portion having a diameter less than the diameter of said cylindrical internal wall means so as to provide a clearance between said upper axial cylindrical end portion and said cylindrical internal wall means, said poppet means having a poppet seat means comprising a first conical section and a second conical section, the larger diameter end of said first conical section coindicing with the smaller diameter end of said second conical section, the cone angle of said second conical section being greater than the cone angle of said first conical section, said poppet means being operable such that said first conical section of said poppet seat means is operable to be received in said cylindrical section of said valve seat means such that when the valve is being closed, said first conical section is received in said cylindrical section to provide pivotal axial alignment of said poppet means as the poppet means pivots about the abutment between said first conical section and said annular seat means at said coincident circle, said clearance between said upper axial cylindrical end portion of said poppet means and said internal wall means allowing said pivoting of said poppet means to provide said pivotal axial alignment.

2. A valve-closing aligning mechanism according to claim 1, wherein said poppet seat means comprises an insert made of a hardened material.

3. A valve-closing aligning mechanism according to claim 2, wherein said hardened material is Stellite.

4. A valve-closing aligning mechanism according to claim 1, wherein said seat conical section of said valve seat means is formed as an insert made of a hardened material.

5. A valve-closing aligning mechanism according to claim 4, wherein said hardened material is Stellite.

6. A valve closing aligning mechanism according to claim 1 further comprising means defining an annular groove in said poppet seat means.

7. A valve-closing aligning mechanism according to claim 1, wherein the difference in diameter between said lower and upper axial cylindrical end portions is 0.5 mm to 1.5 mm.

* * * * *